US010599409B2

(12) United States Patent
Seibel et al.

(10) Patent No.: US 10,599,409 B2
(45) Date of Patent: Mar. 24, 2020

(54) APPLICATION LIFECYCLE OPERATION QUEUEING

(71) Applicant: BlackBerry Limited, Waterloo (CA)

(72) Inventors: James Seibel, Boston, MA (US); Kevin LaFlamme, Boston, MA (US)

(73) Assignee: BlackBerry Limited, Waterloo, Ontario (CA)

(*) Notice: Subject to any disclaimer, the term of this patent is extended or adjusted under 35 U.S.C. 154(b) by 65 days.

(21) Appl. No.: 15/013,438

(22) Filed: Feb. 2, 2016

(65) Prior Publication Data

US 2017/0220331 A1    Aug. 3, 2017

(51) Int. Cl.
*G06F 8/61*  (2018.01)
*G06F 9/54*  (2006.01)
(Continued)

(52) U.S. Cl.
CPC .............. *G06F 8/61* (2013.01); *G06F 9/54* (2013.01); *G06F 21/50* (2013.01); *G06F 21/51* (2013.01);
(Continued)

(58) Field of Classification Search
CPC ... G06F 8/61; G06F 9/54; G06F 21/62; G06F 21/57; G06F 21/566; G06F 21/554;
(Continued)

(56) References Cited

U.S. PATENT DOCUMENTS 6,216,175 B1    4/2001 Sliger et al.
6,260,190 B1    7/2001 Ju
(Continued)

FOREIGN PATENT DOCUMENTS

EP              2743855 B1    5/2017
WO      WO-2010029362 A2 *   3/2010    ............. G06F 21/10
(Continued)

OTHER PUBLICATIONS

McCalla et al., "A Time-Dependent Queueing-Network Model to Describe the Life-Cycle Dynamics of Private-Line Telecommunication Services", 2002, Kluwer Academic (Year: 2002).*
(Continued)

*Primary Examiner* — Wei Y Zhen
*Assistant Examiner* — Junchun Wu
(74) *Attorney, Agent, or Firm* — Conley Rose, P.C.; J. Robert Brown, Jr.

(57) ABSTRACT

A trusted execution environment on an enterprise-enabled computing device allows invocation of a suite of secure applications (apps) on a computing device in an enterprise without hindering external or non-enterprise apps from running on in the same memory space on the same enterprise computing device. An application wrapper provides an operation queue for storing application lifecycle operations while the trusted execution environment is enabled, and the environment is secured. The application defers lifecycle operation to ensure that all security measures are in place before it is allowed to execute. The operation queue receives entries corresponding to the application lifecycle events, and suspends process execution of the lifecycle operations until the secure environment is ready for the operation queued events to be executed.

19 Claims, 4 Drawing Sheets

(51) Int. Cl.
*G06F 21/50* (2013.01)
*G06F 21/51* (2013.01)
*G06F 21/53* (2013.01)
*G06F 21/54* (2013.01)
*G06F 21/55* (2013.01)
*G06F 21/56* (2013.01)
*G06F 21/57* (2013.01)
*G06F 21/62* (2013.01)

(52) U.S. Cl.
CPC .............. *G06F 21/53* (2013.01); *G06F 21/54* (2013.01); *G06F 21/554* (2013.01); *G06F 21/566* (2013.01); *G06F 21/57* (2013.01); *G06F 21/62* (2013.01)

(58) Field of Classification Search
CPC .......... G06F 21/53; G06F 21/51; G06F 21/50; G06F 21/54
USPC ........................................................ 717/175
See application file for complete search history.

(56) References Cited

U.S. PATENT DOCUMENTS

| | | | |
|---|---|---|---|
| 6,915,510 B1 | 7/2005 | Tock et al. | |
| 6,948,164 B2 | 9/2005 | Tinker | |
| 7,178,021 B1 | 2/2007 | Hanna et al. | |
| 7,590,738 B2* | 9/2009 | Mendonca | G06F 21/604 370/390 |
| 7,716,467 B1 | 5/2010 | Deffet et al. | |
| 7,725,890 B2 | 5/2010 | Kawaura | |
| 7,765,579 B2 | 7/2010 | Wallace | |
| 7,779,394 B2 | 8/2010 | Homing et al. | |
| 8,225,308 B2* | 7/2012 | Sedukhin | G06F 8/70 717/174 |
| 8,286,241 B1 | 10/2012 | Yeo et al. | |
| 8,473,724 B1* | 6/2013 | Kenville | G06F 9/30076 712/229 |
| 8,607,200 B2* | 12/2013 | Kunze | G06F 8/62 717/124 |
| 8,869,235 B2 | 10/2014 | Qureshi et al. | |
| 8,887,141 B2 | 11/2014 | Day et al. | |
| 8,898,620 B2* | 11/2014 | Eizenman | G06F 8/20 717/172 |
| 9,037,870 B1 | 5/2015 | Zheng et al. | |
| 9,111,276 B2* | 8/2015 | Haller | G06Q 20/382 |
| 9,112,854 B1 | 8/2015 | Bhimanaik | |
| 9,208,328 B2* | 12/2015 | Russello | G06F 21/60 |
| 9,224,001 B2 | 12/2015 | Ayyalasomayajula et al. | |
| 9,246,690 B1 | 1/2016 | Roth et al. | |
| 9,286,477 B2 | 3/2016 | Sobel et al. | |
| 9,354,849 B2 | 5/2016 | Debate et al. | |
| 9,355,060 B1* | 5/2016 | Barber | H04L 67/2852 |
| 9,515,999 B2 | 12/2016 | Ylonen | |
| 9,529,996 B2 | 12/2016 | Qureshi et al. | |
| 9,635,001 B2 | 4/2017 | Kaseda et al. | |
| 9,866,382 B2 | 1/2018 | Wagner et al. | |
| 10,031,783 B2* | 7/2018 | Jalagam | G06F 9/5072 |
| 10,205,710 B2 | 2/2019 | Mitchell | |
| 10,225,287 B2* | 3/2019 | Aamir | G06F 11/3476 |
| 10,303,879 B1 | 5/2019 | Potlapally et al. | |
| 10,341,327 B2 | 7/2019 | Kola et al. | |
| 2002/0073398 A1 | 6/2002 | Tinker | |
| 2002/0087956 A1 | 7/2002 | Darlet | |
| 2003/0033521 A1 | 2/2003 | Sahlbach | |
| 2003/0079120 A1 | 4/2003 | Hearn et al. | |
| 2004/0015927 A1 | 1/2004 | Haber et al. | |
| 2004/0237067 A1 | 11/2004 | Sun et al. | |
| 2005/0081029 A1 | 4/2005 | Thornton et al. | |
| 2005/0262568 A1 | 11/2005 | Hansen et al. | |
| 2006/0150256 A1 | 7/2006 | Fanton et al. | |
| 2006/0161768 A1 | 7/2006 | Baissus et al. | |
| 2007/0006163 A1* | 1/2007 | Aoki | G06F 21/31 717/127 |
| 2007/0074169 A1 | 3/2007 | Chess et al. | |
| 2007/0271459 A1 | 11/2007 | Gomez | |
| 2008/0059787 A1 | 3/2008 | Hohenberger et al. | |
| 2008/0184225 A1* | 7/2008 | Fitzgerald | G06F 9/455 718/1 |
| 2009/0037921 A1* | 2/2009 | Simpson | G06Q 10/06 718/104 |
| 2009/0089766 A1 | 4/2009 | Day et al. | |
| 2009/0094596 A1* | 4/2009 | Kuiper | G06F 8/61 717/174 |
| 2009/0119653 A1 | 5/2009 | Kettley et al. | |
| 2009/0290712 A1* | 11/2009 | Henry | G06F 21/72 380/277 |
| 2009/0328067 A1 | 12/2009 | Srinivasan et al. | |
| 2010/0037100 A1 | 2/2010 | Lopian | |
| 2010/0287541 A1 | 11/2010 | Saunders et al. | |
| 2010/0303236 A1 | 12/2010 | Laaksonen et al. | |
| 2010/0333079 A1 | 12/2010 | Sverdlov et al. | |
| 2011/0058673 A1 | 3/2011 | Zheng et al. | |
| 2011/0066999 A1 | 3/2011 | Rabinovich et al. | |
| 2011/0087692 A1 | 4/2011 | Masone | |
| 2011/0154031 A1 | 6/2011 | Banerjee et al. | |
| 2012/0023487 A1 | 1/2012 | Letca et al. | |
| 2012/0036554 A1 | 2/2012 | Golan et al. | |
| 2012/0079609 A1 | 3/2012 | Bender et al. | |
| 2012/0124559 A1 | 5/2012 | Kondur | |
| 2012/0159163 A1 | 6/2012 | von Behren et al. | |
| 2012/0204032 A1 | 8/2012 | Wilkins et al. | |
| 2012/0209923 A1 | 8/2012 | Mathur et al. | |
| 2012/0210443 A1 | 8/2012 | Blaisdell et al. | |
| 2012/0291103 A1 | 11/2012 | Cohen | |
| 2012/0328105 A1 | 12/2012 | Mukkara et al. | |
| 2012/0331283 A1 | 12/2012 | Chandran et al. | |
| 2013/0042222 A1* | 2/2013 | Maddela | G06F 8/70 717/124 |
| 2013/0091543 A1 | 4/2013 | Wade et al. | |
| 2013/0097659 A1 | 4/2013 | Das et al. | |
| 2013/0097660 A1 | 4/2013 | Das et al. | |
| 2013/0212388 A1* | 8/2013 | D'Souza | H04L 9/0825 713/168 |
| 2013/0276056 A1 | 10/2013 | Epstein | |
| 2013/0283245 A1 | 10/2013 | Black et al. | |
| 2013/0283400 A1 | 10/2013 | Schneider et al. | |
| 2014/0006773 A1 | 1/2014 | Chazalet et al. | |
| 2014/0007182 A1 | 1/2014 | Qureshi et al. | |
| 2014/0013316 A1 | 1/2014 | Kemmler et al. | |
| 2014/0032691 A1 | 1/2014 | Barton et al. | |
| 2014/0032759 A1 | 1/2014 | Barton et al. | |
| 2014/0040979 A1 | 2/2014 | Barton et al. | |
| 2014/0059525 A1 | 2/2014 | Jawa et al. | |
| 2014/0068273 A1 | 3/2014 | Sobel et al. | |
| 2014/0068593 A1 | 3/2014 | McErlane et al. | |
| 2014/0090077 A1 | 3/2014 | Jeong et al. | |
| 2014/0098449 A1* | 4/2014 | Hellberg | H02J 3/381 361/78 |
| 2014/0165049 A1* | 6/2014 | Diamos | G06F 8/443 717/156 |
| 2014/0177839 A1 | 6/2014 | Wagner et al. | |
| 2014/0181801 A1 | 6/2014 | Voronkov et al. | |
| 2014/0282446 A1 | 9/2014 | Debate et al. | |
| 2015/0040246 A1 | 2/2015 | Yuen et al. | |
| 2015/0046712 A1 | 2/2015 | Korkishko et al. | |
| 2015/0222604 A1 | 8/2015 | Ylonen | |
| 2015/0326567 A1* | 11/2015 | Hamburg | G06F 21/335 713/155 |
| 2016/0072629 A1 | 3/2016 | Kulkarni | |
| 2016/0119292 A1 | 4/2016 | Kaseda et al. | |
| 2016/0283406 A1 | 9/2016 | Linga et al. | |
| 2017/0012953 A1 | 1/2017 | Ylonen | |
| 2017/0019386 A1 | 1/2017 | Ylonen | |
| 2017/0019387 A1 | 1/2017 | Ylonen | |
| 2017/0041349 A1 | 2/2017 | Ylonen | |
| 2017/0063975 A1 | 3/2017 | Prakash et al. | |
| 2017/0163689 A1 | 6/2017 | Ylonen | |
| 2017/0171175 A1 | 6/2017 | Ylonen | |
| 2017/0222995 A1 | 8/2017 | Ylonen | |
| 2017/0366580 A1 | 12/2017 | Ylonen | |

(56) References Cited

U.S. PATENT DOCUMENTS

| | | |
|---|---|---|
| 2017/0366581 A1 | 12/2017 | Ylonen |
| 2018/0025180 A1 | 1/2018 | Wang et al. |
| 2019/0075134 A1 | 3/2019 | Ylonen |

FOREIGN PATENT DOCUMENTS

| | | | | |
|---|---|---|---|---|
| WO | WO-2014052917 A1 | * | 4/2014 | ........... G06F 3/0649 |
| WO | WO-2015196967 A1 | * | 12/2015 | ............. G06F 21/53 |

OTHER PUBLICATIONS

Narayan, "Application Integration Environment for Messaging/Queueing Model", 1995, IEEE (Year: 1995).*

Etkin et al., "Development Life Cycle of Computer Networks : The Executable Model Approach", Sep. 1989, IEEE, vol. IS. No. 9 (Year: 1989).*

An et al., "Effective Workforce Lifecycle Management via System Dynamics Modeling and Simulation", 2007, IEEE (Year: 2007).*

Seibel, James, et al.; U.S. Appl. No. 15/007,547, filed Jan. 27, 2016; Title: Trusted Execution Environment; 25 pages.

Office Action dated Jan. 7, 2015; U.S. Appl. No. 14/208,068, filed Mar. 13, 2014; 14 pages.

Final Office Action dated Jul. 28, 2015; U.S. Appl. No. 14/208,068, filed Mar. 13, 2014; 12 pages.

Advisory Action dated Nov. 30, 2015; U.S. Appl. No. 14/208,068, filed Mar. 13, 2014; 3 pages.

Notice of Allowance dated Jan. 29, 2016; U.S. Appl. No. 14/208,068, filed Mar. 13, 2014; 18 pages.

PCT International Search Report; Application No. PCT/US2014/025397; dated Aug. 7, 2014; 2 pages.

PCT Written Opinion of the International Searching Authority; Application No. PCT/US2014/025397; dated Aug. 7, 2014; 6 pages.

Office Action dated Oct. 4, 2017; U.S. Appl. No. 15/007,547, filed Jan. 27, 2016; 51 pages.

European Extended Examination Report; Application No. 17152587.6; dated Jun. 23, 2017; 7 pages.

European Extended Examination Report; Application No. 17153148.6; dated May 22, 2017; 8 pages.

Final Office Action dated Apr. 24, 2018; U.S. Appl. No. 15/007,547, filed Jan. 27, 2016; 35 pages.

Advisory Action dated Jun. 18, 2018; U.S. Appl. No. 15/007,547, filed Jan. 27, 2016; 5 pages.

Office Action dated Nov. 27, 2018; U.S. Appl. No. 15/007,547, filed Jan. 27, 2016; 52 pages.

Final Office Action dated Jun. 13, 2019; U.S. Appl. No. 15/007,547, filed Jan. 27, 2016; 37 pages.

Advisory Action dated Aug. 27, 2019; U.S. Appl. No. 15/007,547, filed Jan. 27, 2016; 4 pages.

European Examination Report; Application No. 17152587.6; dated Apr. 5, 2019; 6 pages.

Office Action dated Nov. 12, 2019; U.S. Appl. No. 15/007,547, filed Jan. 27, 2016; 41 pages.

* cited by examiner

APPLICATION LIFECYCLE OPERATION QUEUEING

BACKGROUND

Computer security, particularly to safeguard the proprietary and sensitive data of corporations and other enterprises, has become increasingly scrutinized as more and more data travels electronically over public access networks. An enterprise or other organization, however, with many employees or members presents a particular vulnerability, as any user may be leveraged to obtain access. Further, such enterprises may employ a common set of applications on computing devices of each individual user. It is problematic to mandate and enforce exclusive corporate usage of these personal devices; as a practical matter, little control can be exercised over a machine in a user/employee's possession. Additional applications and activities undertaken by users can interfere with and/or compromise enterprise activities on the computing device due to common execution environments shared by the enterprise apps and user supplied apps, resulting in a vulnerability that rests upon the integrity of extraneous apps loaded by the user, particularly when both types of applications are launched by a common operating system in the same memory space.

SUMMARY

A trusted execution environment on an enterprise-enabled computing device, whether owned by the enterprise or the user/employee, hereinafter called an "enterprise computing device", allows invocation of a suite of secure enterprise applications (apps) on a device without hindering external or non-enterprise apps from running on the same enterprise computing device. Each of the enterprise computing devices executes the suite of secure enterprise apps, which interact with each other in a trusted manner such that outside apps or network connections are prevented from accessing the enterprise apps. The enterprise computing device, however, also executes non-enterprise applications which operate independently of the enterprise apps in the same address space, and which can communicate with other non-enterprise apps, and using the same unmodified operating system as the enterprise apps on the enterprise computing device. The trusted execution environment therefore restricts interprocess communication only between the set of enterprise apps and non-enterprise apps, and also permits unimpeded operation of other apps under the same OTS (off the shelf) operating system, thereby providing a trusted or secure execution environment for the enterprise (trusted) apps.

The "lifecycle operations" are the operations performed by the app that require the trusted execution environment to be in place. Following application launch, any lifecycle operations which the application invokes are placed in the operation queue to await proper execution conditions as defined by the execution environment configuration. The lifecycle operations include those that occur as the app is starting, in response to app events (e.g. app created, app loaded), however may be any operation or function by the app that requires the trusted execution environment. For example, any operation during which the app could execute a system call that could expose data outside the secure environment may be considered. The execution conditions typically pertain to ensuring the trusted execution environment, such as access to a secure key store, secure interprocess communication channels, VPN or IP (Internet Protocol) operations, and/or access to particular ranges of IP addresses.

Configurations herein are based, in part, on the observation that application execution environments employ an infrastructure of support operations for maintaining security and privacy of various applications in the execution environment. Unfortunately, conventional approaches to partitioning or safeguarding individual applications suffer from the shortcoming that required infrastructure operations may not commence effective performance before application startup, giving rise to a time window or race condition where certain applications could elude the infrastructure protections provided for maintaining the trusted execution environment. For example, applications may have the ability to communicate with other applications via an IPC (Interprocess Communication) mechanism or network connections before those connections have been secured. The trusted execution environment and related apps and processes provide the infrastructure to monitor and oversee such communications, but effective oversight depends on the execution environment being viable to scrutinize communication traffic prior to application startup, otherwise the applications enjoy a brief interval of unscrutinized communication. Accordingly, configurations herein substantially overcome the shortcomings of conventional approaches by providing an operation queue for storing the lifecycle operations, and deferring execution of the lifecycle operations until completion of the execution conditions that define the trusted execution environment, typically meaning that the infrastructure operations have completed. The operation queue receives entries corresponding to the lifecycle operations, and the system suspends process execution of the lifecycle operations until the trusted execution environment is established.

In further detail, in the trusted execution environment for designating a group of trusted applications for exclusive interprocess communication, a disclosed method for installing an application includes identifying a lifecycle operation for an application, in which the lifecycle operation requires application execution in the trusted execution environment. The wrapper determines, for the lifecycle operation, execution conditions for initiation of the lifecycle operation, and defers execution of the lifecycle operation, or optionally the entire application, such that the delay is based on satisfaction of the execution conditions. For example, a lifecycle operation might involve executing operations that occur upon app first launch. Because this operation could send a message to another app, it must be prevented from doing so until the execution environment is considered "trusted" by establishing appropriate safeguards.

The disclosed approach is expected to operate on a personal, portable computing device such as a smartphone, tablet or laptop, responsive to installed applications, including a memory for installing and executing applications, in which the applications include processor instructions, and a processor for interpreting and executing the processor instructions. The device includes at least one lifecycle operation of an application, in which the lifecycle operation requires application execution in the trusted execution environment, and installation instructions for determining, for the lifecycle operation, execution conditions for initiation of the lifecycle operation.

The computing device further includes a graphical user interface (GUI) on the device, such that the GUI is configured to invoke the application for launch once installed by the above sequence. Upon invocation, the device determines, for each of the lifecycle operations, if each of the execution conditions have been satisfied, and defers invocation of the lifecycle operations until operations corresponding to the execution conditions have completed. While complete application execution could be curtailed, the lifecycle operations represent those that potentially compromise security, and thus only these need be queued pending establishment of the trusted execution environment. Other internal operations of the app are permitted to execute. In this manner, the device ensures proper operation of the enterprise apps by ensuring that the trusted execution environment provided for the lifecycle operations is in force prior to permitting their execution.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Depicted below is an example of an enterprise having a plurality of portable computing devices, as might be used by employees of the enterprise, each exhibiting a secure execution environment. Examples of communication between apps in the secure execution environment depict particular features, however should not be taken to limit approaches of the invention as claimed herein. Various organizational settings may elect computing devices having a secure execution environment in a stationary, mobile, portable, handheld or other physical configuration.

The applications, or apps, as described represent an executable entity launched in the memory space of a computing device. The computing devices have an operating system such as Android™, IOS (iPhone® Operating System), WINDOWS®, Linux or other suitable platform, however it should be emphasized that the techniques disclosed herein are independent of the native OS (Operating System) and do not impose or require changes to the underlying OS of the computing device. The disclosed approach also employs applications in an unmodified (i.e. vendor supplied) form, such that loaded apps do not require a specialized version for compatibility with the disclosed approach.

The disclosed approach allows an application to intercept and defer normal application operation until proper infrastructure conditions are met, e.g. security measures are established and executing on the device. The interception and deferring of these operations resides entirely in the application. Configurations herein employ application wrapping such as that disclosed in the co-pending application discussed in further detail below. On application startup, the app commences to execute lifecycle operations. Each lifecycle operation is intercepted before its code runs and conditions are checked to determine whether or not the operation is allowed to run. If conditions are not yet met, the lifecycle operation is placed on an operation queue to be run at a later time. To make sure that state is properly maintained, the operation and all parameters passed to it are stored in the operation queue.

This method of lifecycle operation blocking allows the application to effectively pause the state of the lifecycle operations until the conditions are met. The code required to set up the necessary conditions in the infrastructure of the trusted execution environment is allowed to run while the particular operations that update the application's state are deferred. Lifecycle operations may be distinguished from internal operations not requiring a trusted execution environment by a status flag or similar structure that is examined by the app to determine whether to execute or queue an lifecycle operation. Alternative approaches may be employed. For example, all operations may be queued, or operations may be grouped to classify the lifecycle operations as emanating from a particular source file or memory area, or bearing a certain flag parameter.

When all conditions are met, an event is fired to start processing the lifecycle operation queue. Each entry in the operation queue is processed one by one in order, passing along saved parameters to bring the application back up to an expected state. From this point following execution of the queued lifecycle operations, the application and its operations behave normally. It should be emphasized that various mechanisms may be employed to designate the operations for queueing and for concluding an appropriate point to release the queue.

An example configuration depicted herein provides an environment for secure applications to communicate with each other in the presence of other insecure apps. This is implemented within the applications themselves, and therefore does not rely on the operating system to provide a special trusted container. Individual processes in the trusted execution environment are wrapped to provide interception of system calls which affect communication and invocation of other processes. In the discussion and figures that follow, the graphical representation of the applications (apps) are depicted as a circular entity and the wrapper as a larger concentric entity around the app, and code segments depicted as boxes within the concentric entities. The representation is not intended to restrict particular implementations but rather to illustrate one possible manner in which the software may be architected. A typical arrangement incorporates logic elements as code represented by dynamic linked libraries (DLLs), as discussed in detail in co-pending U.S. patent application Ser. No. 14/208,068, filed Mar. 13, 2014, entitled "MODIFICATION OF COMPILED APPLICATIONS AND APPLICATION MANAGEMENT USING RETRIEVABLE POLICIES," incorporated herein by reference. Other arrangements of code and memory of the apps and operations discussed herein may be performed, depending on the relevant operating system and compiling and/or interpreting facilities.

The applications, or apps, as described represent an executable entity launched in the memory space of a computing device. The computing devices have an operating system such as Android™, IOS (iPhone® Operating System), WINDOWS®, Linux or other suitable platform, however it should be emphasized that the techniques disclosed herein are independent of the native OS and do not impose or require changes to the underlying OS of the computing device. The disclosed approach also employs unmodified applications, such that installed apps do not require a specialized version for compatibility with the disclosed approach.

Figure 1:
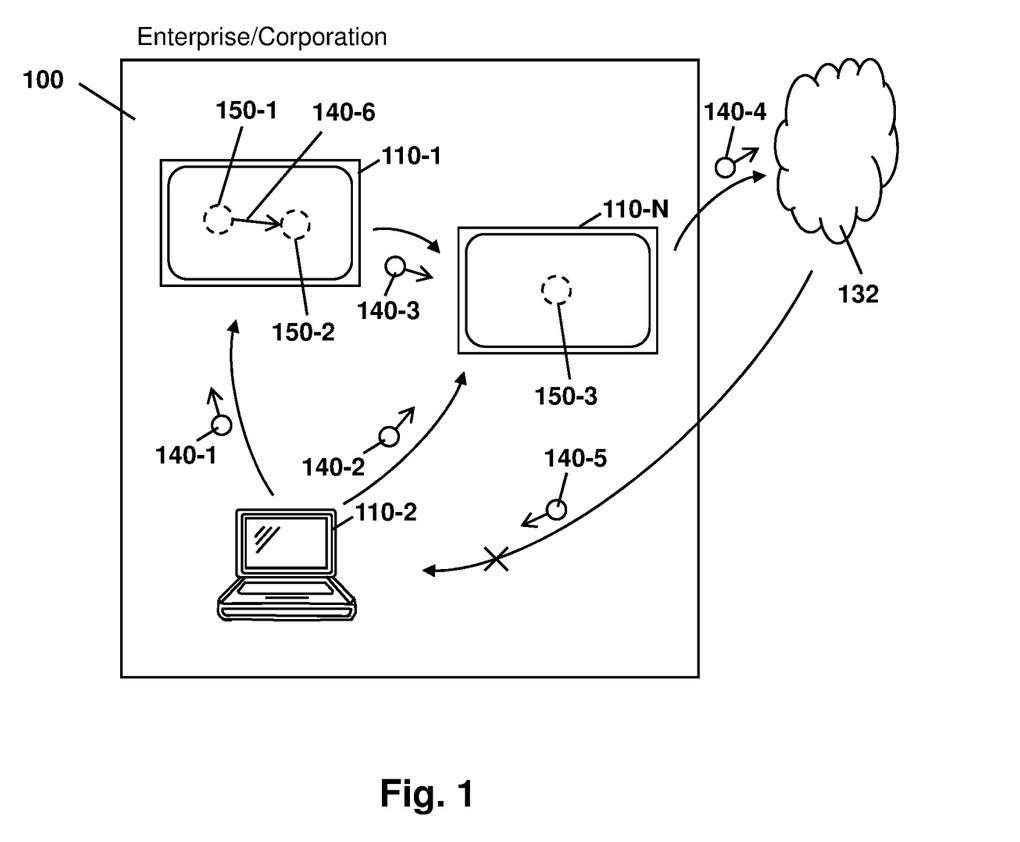
FIG. 1 is a context diagram of an enterprise environment suitable for use with configurations herein.

FIG. 1 is a context diagram of an enterprise environment suitable for use with configurations herein. Referring to FIG. 1, in an enterprise setting 100 such as a corporation or business a particular set or suite of apps for handling proprietary, or corporate sensitive, information. The enterprise provides portable computing devices 110-1 . . . 110-N (110 generally) for each employee. The computing devices 110 may be tablets, laptops, handheld or phone type devices, or may even be more stationary devices such as desktops. Each of the computing devices 110 executes applications (apps) 150-1 . . . 150-N (150 generally), which send messages 140-1 . . . 140-N (140 generally) to other apps 150 on the same or other computing devices 110, which may be remotely accessible over a public infrastructure network 132 such as the Internet. Each of the apps 150 is generally defined by a process running under the OS, however more complex apps may include more than one process. The operations executed by the app 150 include lifecycle operations, which require execution in an established infrastructure defined by a trusted execution environment, and internal operations which remain internal to the app. Prior to establishment of the trusted execution environment, lifecycle operations 160 are deferred and stored in an operation queue pending establishment of a trusted execution environment, such that no secure data leaves the secure app space, and no insecure data is allowed into the secured app space defined by the trusted execution environment.

Figure 2:
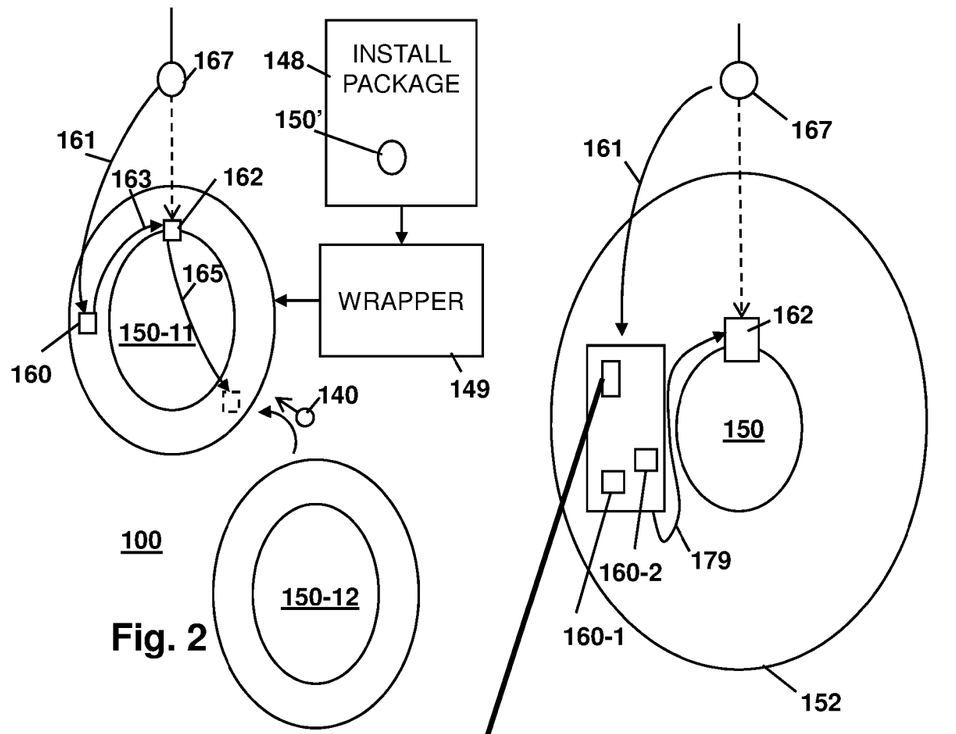
FIG. 2 is an execution environment as in FIG. 1 depicting the lifecycle operations.

FIG. 2 is an execution environment as in FIG. 1 depicting the lifecycle operations 160. Referring to FIGS. 1 and 2, an application 150-11 has one or more lifecycle operations 160, which are intended to execute only after certain other operations (i.e. infrastructure operations to establish the trusted execution environment) on which it is dependent are allowed to complete. Generally, the lifecycle operations include operations that require the trusted execution environment. The other operations may be external to the app 150, or may be performed by other threads within the same app, to avoid blocking a lifecycle operation waiting for another operation or process that cannot complete in a blocked state. In either case, the lifecycle operation 160 is paused until the conditions on which it is dependent are satisfied. Blocking the lifecycle operation 160 may also prevents general app 150 execution until the lifecycle operations are all completed, as the lifecycle operations 160 often precede general execution of the app 150, such as startup or initialization functions.

In the example configuration, the lifecycle operations 160 are lifecycle operations executed as a normal aspect of the app. The trusted execution environment includes trusted apps coexisting with untrusted apps in a common address space, typically by modifying the trusted apps using a wrapper, as discussed further below. The trusted execution environment 100 supports a plurality of applications 150. Since IPC communication represents a potential infiltration route to an app 150, the deferred invocation of lifecycle operations 160 in each of the plurality of applications 150 may prevent interprocess communication and other forms of data input/output of the applications 150 in the trusted execution environment with other applications in the trusted execution environment.

In the app 150, lifecycle operations 160 are application operations that require adequate security measures to ensure that insecure I/O, including communication with the app, does not occur. For example, the lifecycle operations 160 may invoke an interprocess communication (IPC) mechanism to exchange information with another process. Blocking a lifecycle operation 160 until certain conditions are met ensures that proper safeguards and checks are in place to scrutinize and control information exchanged with other processes, and also guards against subtle timing differences, or "race conditions" between other processes and/or threads that could cause a misordering of startup operations. The conditions upon which the lifecycle operation relies are those which provide the proper secure environment in which to perform the lifecycle operations of the application. Such startup conditions, and the ordering thereof, ensure that an appropriate execution environment is in place prior to general app 150 execution.

In order to ensure that appropriate control is exercised over installed apps for preventing premature execution of the lifecycle events that should be queued, corresponding structures are put in place prior to application execution. In the example configuration, this is performed by the wrapper operation disclosed copending application cited above. Such wrapping occurs prior to app 150 execution, and preferable prior to or in conjunction with the installation process.

In an example configuration, the application 150 undergoes a wrapping operation prior to installation to ensure that the lifecycle operations 160 are designated in the app prior to general app execution. Installations are typically handled by a wrapper 149, which is a program that receives an installation package 148 including the app 150' for installation, as well as other administrative directives for ensuring that administrative details such as program registry updates and start menu designations are handled. During installation, an original execution point (OEP) 162 of the app is identified and redirected from an interception point 167, as shown by arrow 161, so that the lifecycle operations 160 may be completed and verified prior to permitting general execution of the app 150-11. Lifecycle operations 160.

The wrapper 149 applies the wrapper code to the app 150 which performs scrutiny of lifecycle operations. Events pertaining to the lifecycle operation 160 are intercepted or "hooked" by the wrapper, either when the wrapper code is applied or during app invocation/execution. The wrapper code (180, FIG. 3 below) includes the instructions and logic that identify the lifecycle events and enqueue them for subsequent execution at an appropriate time. The events have no knowledge that they are wrapped, they are just experiencing normal invocation. The wrapper 149 applies the wrapper code such that, based on the events, the wrapper code 180 queues events triggering lifecycle operations 160 as needed until the secure environment is set up. Once the secure environment is there, the events are fired, and occasionally omitted or skipped, as discussed below, if their execution is now moot or redundant. Following completion of the queued lifecycle operations 160 after the operation queue is drained, control is returned to the original execution point. 162, as shown by arrow 163, for general process execution in a state similar to the app as if the queued operations had executed without being queued or as would have occurred in an unwrapped app.

During invocation of the lifecycle operations 160, general process execution, such as receiving a message 140 from another process 150-12 via an IPC mechanism 170, is prevented. The point of this is to prevent the app from taking actions before those actions are secured. IPC communications are employed as an example of a secured lifecycle operation that requires the queueing to ensure that execution occurs in a trusted environment. However, the goal is to prevent any form of I/O or other potentially compromising activity, which includes IPC but also simple file read/write and also network access. Network access is not typically between wrapped apps on different devices, it is between wrapped apps and any server on the Internet or on a private network.

Once the lifecycle operations 160 have completed according to the preconditions, general execution of the app 150-11 may occur, such as sending a communication to another process, processing an incoming message, and other actions. This ensures that before the app 150 accesses files, network, etc. that the environment for doing so is secured. It should be noted that the lifecycle operations affect process communication in both directions. The app is blocked from both sending and receiving any data until all of the lifecycle operations are complete, at which point the intercepted messages will be received and sent in order as part of the operation queue. Further, while the lifecycle operations 160 are generally categorized as those which exchange data outside of the app 150, any operation in the app may be queued pending a trusted execution environment, and each app 150 maintains a set of execution conditions defining what is deemed sufficient to release the operation queue for permitting the lifecycle operations to execute.

Figure 3:
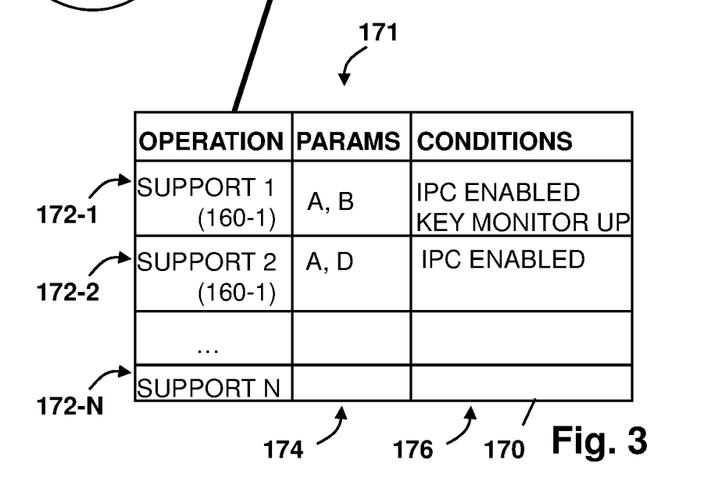
FIG. 3 shows a operation queue corresponding to an application as in FIG. 1.

FIG. 3 shows an operation queue corresponding to an application 150 as in FIG. 1. In an example configuration, the deferred lifecycle operations (160-1, 160-2) are stored in an operation queue 170 for maintaining an invocation of each lifecycle operation until the required preconditions (conditions) are met. The operation queue 170 stores entries 172-1 . . . 172-N (172 generally) corresponding to each lifecycle operation 150. Each entry 172 includes the name 171 of a lifecycle operation 160, a parameter list 174 and a condition set 176 (conditions) for invocation. During launch, the execution environment 100 redirects launch from the redirection point 167 to a program or code sequence defined as wrapper code 180 in the wrapper 152. The wrapper code identifies the lifecycle operations 152-1 . . . 152-2 (152 generally) and the operation queue 170 for deferring the lifecycle operations. It should be noted that the queued lifecycle operations need not be limited to those occurring at startup, but rather they represent normal process ("lifecycle") processing which was merely deferred until the execution environment was "safe" (i.e. trusted). Upon satisfaction of the conditions 176, the entries 172 are pulled from the operation queue 170 and the corresponding lifecycle operations 160 executed with the parameter list 174 stored in the entry 172.

In a particular configuration, when all of the conditions are finally met, an event triggers to commence app processing of the queued operations by pulling the lifecycle operations from the operation queue. When executing the queued lifecycle operations, it is ensured that expected conditions for that operation are met. If the conditions for the operation are no longer relevant, processing skips over that queued operation if it is no longer applicable in the execution context. Situations may arise where the queued operations have become obsolete and/or redundant, and execution of that operation might unfavorably alter the state of the execution environment instead of properly restoring the state to what the application expects, i.e. proper, robust security measures being in place.

Figure 4A:
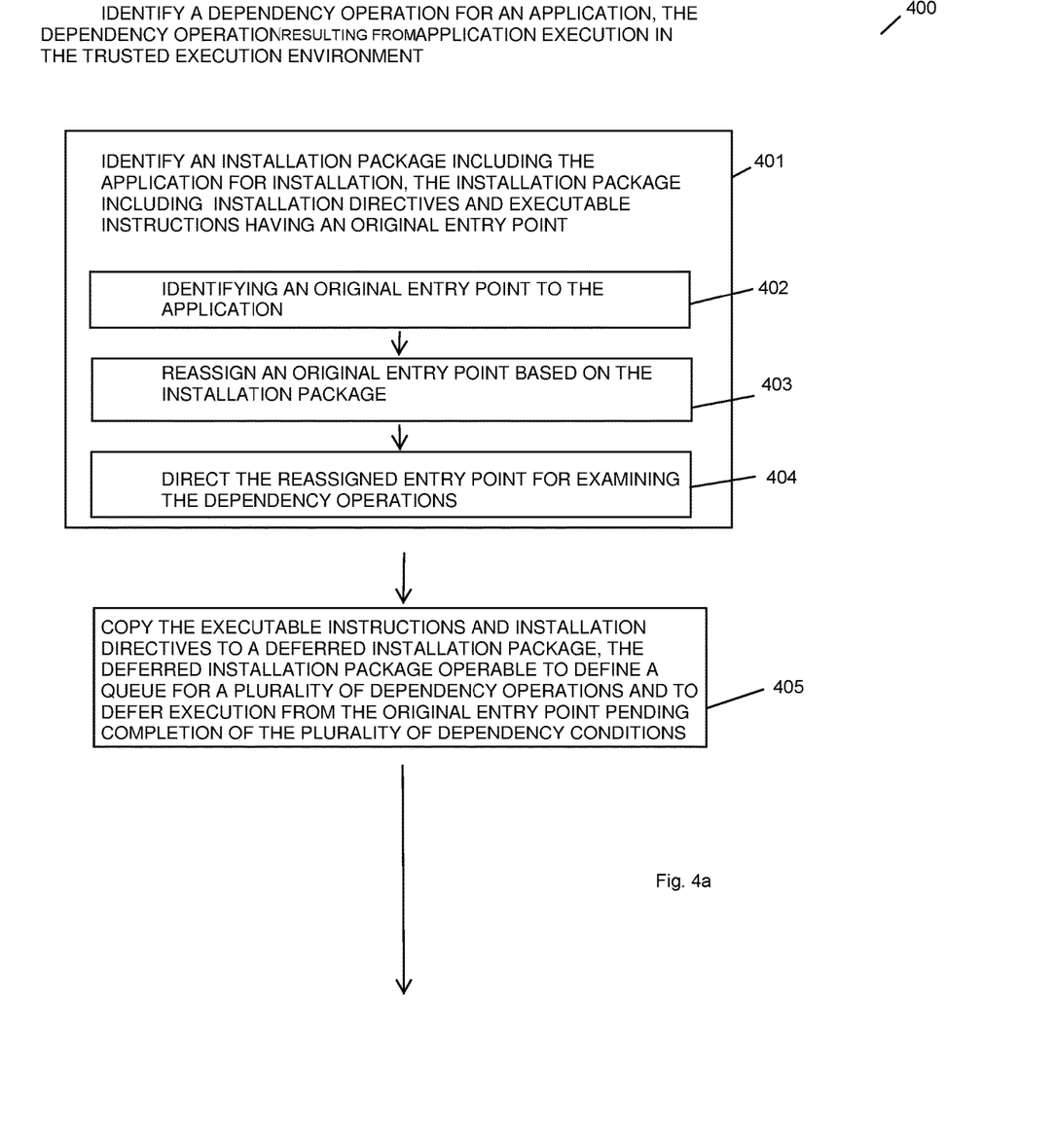
FIGS. 4a and 4b show a flowchart of the operation of the operation queue of FIG. 3.
Figure 4B:
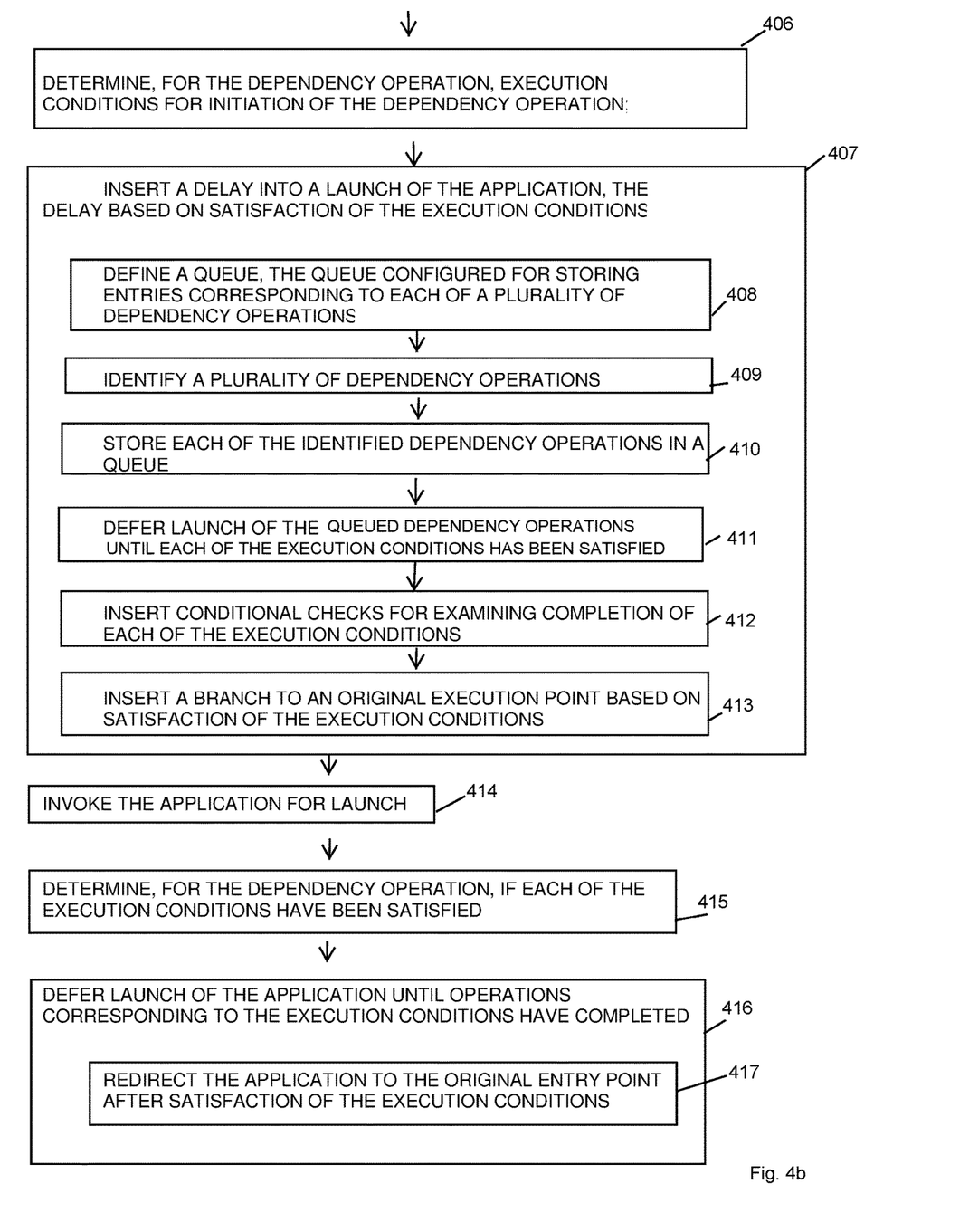

FIGS. 4a and 4b show a flowchart of the operation of the operation queue of FIG. 3. Referring to FIGS. 2-4b, in the trusted execution environment 100 for separating a group of trusted applications 160 for exclusive interprocess communication, the disclosed method for installing an application includes, at step 400, identifying a lifecycle operation 160 for an application, the lifecycle operation, or dependency operation (due to dependency on the trusted execution environment) resulting from application execution in the trusted execution environment. The execution environment 100 identifies an installation package 148 including the application 150' for installation, in which the installation package 148 includes installation directives and executable instructions having the OEP 162, as depicted at step 401. This includes, identifying the original entry point 162 to the application 150, as depicted at step 402, and reassigning the original entry point 162 based on the installation package 148, as shown at step 403. The wrapper 149 directs the reassigned entry point for examining and executing the lifecycle operations 150, as shown by arrow 161 and depicted at step 404.

The wrapper 149 copies the executable instructions and installation directives to a deferred installation package, such that the deferred installation package is defined by wrapper code 153 operable to define the operation queue 170 for one or more lifecycle operations 160 and to defer execution from the original entry point 162 pending completion of the plurality of lifecycle operations, as shown at step 405. Further, the lifecycle operations may include either startup operations or operations resulting from normal process execution. The intended result is that actions defined by the lifecycle operations do not occur/execute until the execution conditions defining a secure environment are in place. The installation package 148 also includes the code and DLLs of the application to be installed 150'.

During app 150 installation, the wrapper 148 determines, for the lifecycle operation, execution conditions for initiation of the lifecycle operation 160, as depicted at step 406, and inserts a delay into a launch of the application 150, such that the delay is based on satisfaction of the execution conditions, as disclosed at step 407. The inserted delay (performed above by the operation queue) is responsive to an interception of a launch instruction for the application 150, which further includes instructions for returning control to an original execution point or other normal app execution state following completion of the lifecycle operations, as shown by arrow 179.

Insertion of the delay, in the example of FIG. 3, further includes defining an operation queue 170 configured for storing entries 172 corresponding to each of a plurality of lifecycle operations 160, as depicted at step 408. The wrapper 148 identifies one or more lifecycle operations 160-N for inclusion, as disclosed at step 409 and stores an entry 172 for each of the identified lifecycle operations 160 in the operation queue 170, as shown at step 410. The queued lifecycle operations include parameter lists 174, and the operation queue 170 also stores the parameter lists 174 corresponding to each of the lifecycle operations 160 in the entry 172 along with the conditions 176 that need to be satisfied for execution of the lifecycle operation 160.

The inserted wrapper code 153 defers launch of the application 150 until each of the operation queued lifecycle operations 160 has completed, shown at step 411 as control is not returned to the OEP 162 or other execution point until all entries 172 have been processed off the operation queue 170. The inserted delay is a conditional delay, and the wrapper also inserts conditional checks for examining completion of each of the execution conditions 176, as depicted at step 412. The wrapper 149 also inserts a branch back to the original execution point 162 based on satisfaction of the execution conditions 176, as disclosed at step 413, as after all entries 172 have been pulled off the operation queue 170 and the lifecycle operations 160 stored in those entries executed, the app 150 may commence.

It should be emphasized that the lifecycle operation is an application action/function/execution that relies on the wrapper to ensure that execution is deferred (queued) until the environment is ready. The operation queued lifecycle operations are the actions that the app wishes to take prior to the environment being ready. For example, the app wants to make a network connection. The wrapper detects that, but sees that the VPN is not available. It operation queues the network operation, and delays execution until the VPN is ready Following installation of the app 150 along with the wrapper code 153 for establishing and checking the lifecycle operations 160, an input is received to invoke the application 150 for launch, as disclosed at step 414. The executing app 150 determines, for each of the lifecycle operations 160 in the operation queue 170, if each of the execution conditions 176 have been satisfied, as depicted at step 415, and defers launch of the application 150 until the execution conditions 176 have been satisfied and/or completed, as shown at step 416. The execution conditions generally pertain to establishment of the trusted execution environment, such as enablement of IPC mechanisms and launch of a keystore process for managing encryption between the apps 150. The wrapper code 152 redirects the application 150 to the original entry point to resume normal operation after satisfaction of the execution conditions 176 and execution of the queued lifecycle operations.

It will be appreciated by those skilled in the art that alternate configurations of the disclosed invention include a multiprogramming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable storage medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a non-transitory computer readable storage medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. In a trusted execution environment for designating a group of trusted applications for exclusive interprocess communication in a computing device, a method for installing an application, comprising:

identifying an installation package for the application, the installation package including installation directives and executable instructions;

identifying a lifecycle operation within the executable instructions;

determining, for the lifecycle operation, execution conditions for initiation of the lifecycle operation; and inserting a delay into the executable instructions prior to an invocation of the lifecycle operation, the delay being based on satisfaction of the execution conditions;

wherein deferred invocation of the lifecycle operation prevents interprocess communication of the application in the trusted execution environment with other applications in a common address space;

wherein the executable instructions have an original entry point, and further comprising: copying the executable instructions and installation directives to a deferred installation package, the deferred installation package operable to define an operation queue for a plurality of lifecycle operations and to resume execution from the original entry point pending completion of the plurality of lifecycle operations.

2. The method of claim 1 further comprising:
invoking the application for launch;
determining, for the identified lifecycle operation, if each of the execution conditions have been satisfied; and
deferring launch of the lifecycle operations until operations corresponding to the execution conditions have completed.

3. The method of claim 2 further comprising:
defining an operation queue, the operation queue configured for storing entries corresponding to each of a plurality of lifecycle operations.

4. The method of claim 2 further comprising:
identifying a plurality of lifecycle operations;
storing each of the identified lifecycle operations in an operation queue; and
deferring launch of the queued lifecycle operations until each of the execution conditions has been satisfied, the execution conditions based on establishment of the trusted execution environment.

5. The method of claim 1 wherein the delay is a conditional delay, further comprising:
inserting conditional checks for examining completion of each of the execution conditions; and
inserting a branch to an original execution point based on satisfaction of the execution conditions.

6. The method of claim 1 wherein the inserted delay is responsive to an interception of a launch instruction for the application, further comprising returning control to an original execution point following completion of the lifecycle operations.

7. The method of claim 4 wherein the lifecycle operations include parameter lists, further comprising storing, in the operation queue, the parameter lists corresponding to each of the lifecycle operations.

8. The method of claim 1 wherein the dependent operation is a lifecycle operation of normal app execution in the trusted execution environment, the trusted execution environment coexisting with untrusted apps in the common address space.

9. The method of claim 1 further comprising:
identifying an original entry point to the application;
reassigning an original entry point based on the installation package;
directing the reassigned entry point for examining the lifecycle operations; and
redirecting the application to the original entry point after satisfaction of the execution conditions.

10. A computing device responsive to installed applications within a trusted execution environment, comprising:
a memory for installing and executing applications, the applications including processor instructions;
a processor for interpreting and executing the processor instructions;
an installation package for an application, the installation package including installation directives and executable instructions; and
installation instructions for identifying a lifecycle operation within the executable instructions, determining execution conditions for initiation of the lifecycle operation, the installation instructions further operable to insert a delay into the executable instructions prior to a launch of the lifecycle operation, the delay being based on satisfaction of the execution conditions;
wherein deferred invocation of the lifecycle operation prevents interprocess communication of the application in the trusted execution environment with other applications in a common address space;
wherein the executable instructions have an original entry point, and further comprising:
copying the executable instructions and installation directives to a deferred installation package, the deferred installation package operable to define an operation queue for a plurality of lifecycle operations and to resume execution from the original entry point pending completion of the plurality of lifecycle operations.

11. The device of claim 10 further comprising:
a graphical user interface (GUI) on the device, the GUI configured to invoke the application for launch, the computing device further configured to:
determine, for the identified lifecycle operation, if each of the execution conditions have been satisfied; and
defer launch of the lifecycle operation until operations corresponding to the execution conditions have completed.

12. The device of claim 11 further comprising:
an operation queue configured for storing entries corresponding to each of a plurality of lifecycle operations.

13. The device of claim 11 further comprising:
application startup instructions operable to:
identify a plurality of lifecycle operations;
store each of the identified lifecycle operations in an operation queue; and
defer launch of the lifecycle operations until operations corresponding to the execution conditions have completed, the execution conditions defining the trusted execution environment for ensuring secure execution of the lifestyle operations.

14. The device of claim 10 wherein the delay is a conditional delay, the installation instructions further configured to:
insert conditional checks for examining completion of each of the execution conditions; and
insert a branch to an original execution point based on satisfaction of the execution conditions.

15. The device of claim 10 wherein the executable instructions have an original entry point, and further comprising:
a deferred installation package, the deferred installation package operable to define an operation queue for a plurality of lifecycle operations and to defer execution from the original entry point pending completion of the plurality of lifecycle operations, the installation package responsive to the installation instructions for transferring control to the deferred installation package.

16. The device of claim 15 wherein the inserted delay is responsive to an interception of a launch instruction for the application, further comprising returning control to an original execution point following completion of the lifecycle operations.

17. The method of claim 1 further comprising:
identifying an original entry point to the application;
reassigning an original entry point based on the installation package;
directing the reassigned entry point for examining the lifecycle operations; and
redirecting the application to the original entry point after satisfaction of the execution conditions.

18. A computer program product having instructions stored on a non-transitory computer readable storage medium for performing, in a trusted execution environment, a method of installing an application on a computing device, the method comprising:
identifying an installation package for the application, the installation package including installation directives and executable instructions;
identifying a lifecycle operation within the executable instructions;
determining, for the lifecycle operation, execution conditions for initiation of the lifecycle operation;
upon invoking the application for launch, determining, for the lifecycle operation, if each of the execution conditions have been satisfied; and
deferring launch of the application until operations corresponding to the execution conditions have completed;
wherein deferred launch of the application prevents interprocess communication of the application in the trusted execution environment with other applications in a common address space;
wherein the executable instructions have an original entry point, and further comprising:
copying the executable instructions and installation directives to a deferred installation package, the deferred installation package operable to define an operation queue for a plurality of lifecycle operations and to resume execution from the original entry point pending completion of the plurality of lifecycle operations.

19. The method of claim 1, further comprising:
determining if the deferred lifecycle operation continues to be relevant to process execution; and
omitting the deferred lifecycle operation if execution would be ineffective.

* * * * *